US012152350B2

(12) United States Patent
Hu et al.

(10) Patent No.: US 12,152,350 B2
(45) Date of Patent: Nov. 26, 2024

(54) ONE-STEP INTEGRALLY-FORMED BAMBOO SLEEPER AND PREPARATION METHOD THEREOF

(71) Applicant: HUNAN TAOHUAJIANG BAMBOO SCIENCE & TECHNOLOGY CO., LTD., Hunan (CN)

(72) Inventors: Jinbo Hu, Hunan (CN); Jian Peng, Hunan (CN); Weihong Zeng, Hunan (CN); Yanhui Xiong, Hunan (CN); Diqin Liu, Hunan (CN); Zhicheng Xue, Hunan (CN); Xianjun Li, Hunan (CN); Zhiping Wu, Hunan (CN); Shanshan Chang, Hunan (CN); Gonggang Liu, Hunan (CN); Ting Li, Hunan (CN)

(73) Assignee: HUNAN TAOHUAJIANG BAMBOO SCIENCE & TECHNOLOGY CO., LTD., Hunan (CN)

( * ) Notice: Subject to any disclaimer, the term of this patent is extended or adjusted under 35 U.S.C. 154(b) by 764 days.

(21) Appl. No.: 17/424,501

(22) PCT Filed: Apr. 18, 2019

(86) PCT No.: PCT/CN2019/083250
§ 371 (c)(1),
(2) Date: Jul. 21, 2021

(87) PCT Pub. No.: WO2020/151103
PCT Pub. Date: Jul. 30, 2020

(65) Prior Publication Data

US 2022/0081848 A1 Mar. 17, 2022

(30) Foreign Application Priority Data

Jan. 23, 2019 (CN) ........................ 201910063367.0

(51) Int. Cl.
*E01B 3/02* (2006.01)
*B27K 3/12* (2006.01)
(Continued)

(52) U.S. Cl.
CPC .................. *E01B 3/02* (2013.01); *B27K 3/12* (2013.01); *B27K 3/16* (2013.01); *B27K 9/002* (2013.01);
(Continued)

(58) Field of Classification Search
CPC ..... E01B 3/02; E01B 3/44; E01B 3/46; E01B 3/42; E01B 3/26; B27K 3/12; B27K 3/16;
(Continued)

(56) References Cited

U.S. PATENT DOCUMENTS 5,972,467 A * 10/1999 Washo ..................... B27N 3/04 144/380
2003/0026942 A1* 2/2003 Hejna ..................... B32B 21/14 427/508
(Continued)

FOREIGN PATENT DOCUMENTS

CN 102672777 9/2012
CN 102672777 A * 9/2012
(Continued)

OTHER PUBLICATIONS

"International Search Report (Form PCT/ISA/210) of PCT/CN2019/083250", mailed on Aug. 1, 2019, with English translation thereof, pp. 1-4.

(Continued)

*Primary Examiner* — Zachary L Kuhfuss
*Assistant Examiner* — James William Jones
(74) *Attorney, Agent, or Firm* — JCIP GLOBAL INC.

(57) ABSTRACT

The present invention discloses a one-step integrally-formed bamboo sleeper. For the one-step integrally-formed bamboo
(Continued)

sleeper, a bamboo unit is used as a raw material, to be dried and modified at the temperature of 110-180° C., and then subject to adhesive dipping, adhesive throwing, solidification, dopamine solution treatment, anti-mildew and/or anti-corrosion and/or anti-insect treatment, and fastening, to obtain the one-step integrally-formed bamboo sleeper with a density of 0.9-1.5 g/cm$^3$. The present invention further provides a preparation method for the foregoing bamboo sleeper. The bamboo sleeper prepared in the present invention has a suitable elastic modulus, and applicable for ballasted tracks of railways and urban rail transit systems.

17 Claims, 3 Drawing Sheets

(51) Int. Cl.

| | |
|---|---|
| ***B27K 3/16*** | (2006.01) |
| ***B27K 9/00*** | (2006.01) |
| ***E01B 3/26*** | (2006.01) |
| ***E01B 3/42*** | (2006.01) |
| ***E01B 3/44*** | (2006.01) |
| ***E01B 3/46*** | (2006.01) |
| *B27N 1/00* | (2006.01) |
| *B27N 3/00* | (2006.01) |
| *B27N 3/18* | (2006.01) |
| *B27N 3/20* | (2006.01) |

(52) U.S. Cl.
CPC .................. *E01B 3/26* (2013.01); *E01B 3/42* (2013.01); *E01B 3/44* (2013.01); *E01B 3/46* (2013.01); *B27N 1/00* (2013.01); *B27N 3/002* (2013.01); *B27N 3/18* (2013.01); *B27N 3/203* (2013.01)

(58) Field of Classification Search
CPC .......... B27K 9/002; B27N 3/203; B27N 3/18; B27N 3/002; B27N 1/00
USPC ........................................................... 238/83
See application file for complete search history.

(56) References Cited

U.S. PATENT DOCUMENTS

| | | | | |
|---|---|---|---|---|
| 2003/0150522 A1* | 8/2003 | Suzuki | B27N 3/143 144/380 |
| 2012/0237720 A1* | 9/2012 | Djerf | B27M 3/0053 144/333 |
| 2016/0024720 A1* | 1/2016 | Cialone | B29C 70/025 238/85 |
| 2016/0208441 A1* | 7/2016 | Avraham | E01B 3/02 |
| 2016/0325530 A1* | 11/2016 | Slaven, Jr. | B32B 5/26 |
| 2017/0114541 A1* | 4/2017 | Hebel | E04C 5/168 |
| 2018/0215069 A1* | 8/2018 | Lewis | B32B 7/04 |

FOREIGN PATENT DOCUMENTS

| | | | | | |
|---|---|---|---|---|---|
| CN | 103085148 | A | * | 5/2013 | |
| CN | 202954271 | | | 5/2013 | |
| CN | 103770168 | A | * | 5/2014 | |
| CN | 104875270 | A | * | 9/2015 | |
| CN | 104960069 | A | * | 10/2015 | |
| CN | 107009457 | | | 8/2017 | |
| CN | 107009457 | A | * | 8/2017 | |
| CN | 107090186 | | | 8/2017 | |
| CN | 107090186 | A | * | 8/2017 | |
| CN | 107471386 | A | * | 12/2017 | |
| CN | 108032405 | A | * | 5/2018 | B27K 3/12 |
| CN | 108202378 | A | * | 6/2018 | |
| CN | 108393986 | A | * | 8/2018 | |
| CN | 108638251 | A | * | 10/2018 | |
| JP | 2015058640 | A | * | 3/2015 | |

OTHER PUBLICATIONS

"Written Opinion of the International Searching Authority (Form PCT/ISA/237) of PCT/CN2019/083250", mailed on Aug. 1, 2019, pp. 1-4.

* cited by examiner

| Serial number | Inspection items | Reference standard | Unit | Test results | Remarks |
|---|---|---|---|---|---|
| 1 | Density | GB/T30364-2013 | $g/cm^3$ | 0.95 | |
| 2 | UV resistance | ISO 4892-3:2016 | Gray level | level 4 | |
| | | | △E*ab | 1.70 | |
| 3 | Water absorption thickness expansion rate | GB/T30364-2013 | % | 2.8 | |
| 4 | Anti-skid performance | DD CEN/TS 15676-2007 | Dry state | 68 | Take the average value of 15 samples |
| 5 | Hardness | EN 1534-2010 | $N/mm^2$ | 8.60 | |
| 6 | Flexural modulus of elasticity | EN ISO 178:2010/Amd.1:2013 method A | MPa | 12900 | |
| 7 | Horizontal shear strength | GB/T30364-2013 | MPa | 16 | |

FIG. 3

ONE-STEP INTEGRALLY-FORMED BAMBOO SLEEPER AND PREPARATION METHOD THEREOF

CROSS-REFERENCE TO RELATED APPLICATION

This application is a 371 of international application of PCT application serial no. PCT/CN2019/083250, filed on Apr. 18, 2019, which claims the priority benefit of China application no. 201910063367.0, filed on Jan. 23, 2019. The entirety of each of the above mentioned patent applications is hereby incorporated by reference herein and made a part of this specification.

BACKGROUND

Technical Field

The present invention relates to the field of new materials for railways and urban rail transit systems, in particular to a one-step integrally-formed bamboo sleeper and a preparation method thereof.

Description of Related Art

At present, most ballasted tracks in railways and urban rail transit systems adopt wooden sleepers, concrete sleepers, steel sleepers, composite material sleepers, and the like. After long-term engineering application, it is found that: the wooden sleepers have a short service life and are easy wear and easy to be eroded by organisms, that different wooden sleepers have different mechanical properties, and that chemicals such as creosote needed for anti-corrosion treatment of the wooden sleepers may harm the environment and human health, and so on; when it comes to the concrete sleepers, train loads may cause great dynamic stress damage to railway tracks due to the high rigidity of the concrete sleepers, and moreover, there is a risk of impact damage due to concrete sleepers' poor insulation, high brittleness, and poor elasticity, and they are also featured with low stability, heavy weight, and being difficult for replacement and recovery, the extremely high cost for waste treatment, and high carbon consumption which may affect the environment; the steel sleepers also have some disadvantages, such as non-insulation, high driving noise, high rigidity, easy corrosion, and high carbon consumption which may affect the environment; and the composite material sleepers have also been found to have some disadvantages, such as light weight, poor holding ability of fasteners and bolts, uneven strength of bonding layer, and brittleness due to environmental influence. Especially, the production of raw materials for concrete, steel and composite material sleepers emits a large amount of carbon dioxide to the atmosphere, which may have a huge impact on the environment. In fact, there is a certain requirement on the elastic modulus for an ideal sleeper. Both the relatively low elastic modulus of the wooden sleepers and the relatively large elastic modulus of concrete sleepers should be avoided, and the elastic modulus of an ideal sleeper should be between the elastic modulus of wooden sleeper and the elastic modulus of concrete sleeper.

Bamboo is an important forest resource in China, with excellent physical and mechanical properties, especially, in aspect of the elastic modulus, and a quite wide application range. Moreover, regular felling of bamboo is beneficial to bamboo growth and ecological environment, and the new material of bamboo have been widely used outdoors.

SUMMARY

The technical problem to be solved by the present invention is to overcome the disadvantages of the prior art, and provide a one-step integrally-formed bamboo sleeper suitable for ballasted tracks of railways and urban rail transit systems and a preparation method thereof.

In order to solve the above technical problem, the present invention adopts the following technical solution.

A one-step integrally-formed bamboo sleeper is provided, where the one-step integrally-formed bamboo sleeper is obtained by using a bamboo unit as a raw material, dried and modified at the temperature of 110-180° C., undergone adhesive dipping, adhesive throwing, curing, dopamine solution treatment, and anti-mildew and/or anti-corrosion and/or anti-insect treatment, and then fastened, and a density of the one-step integrally-formed bamboo sleeper is 0.9-1.5 g/cm$^3$.

As a general inventive concept, the present invention further provides a preparation method of the one-step integrally-formed bamboo sleeper, including the following steps:

1) drying and modifying the pretreated bamboo unit by using water vapor with a superheat degree of 10-80° C., until a water content of the bamboo unit is 8-20%, to obtain a dried and modified bamboo unit;
2) dipping the dried and modified bamboo unit obtained in step 1) in an adhesive to perform adhesive dipping, adhesive throwing, draining, and drying, until the water content of the bamboo unit is 10%-16%, to obtain a blank;
3) curing and solidifying the blank in step 2), to obtain a bamboo sleeper billet;
4) coating a dopamine solution on a surface of the bamboo sleeper billet in step 3), and then performing anti-mildew and/or anti-corrosion and/or anti-insect treatment, to obtain a bamboo sleeper; and
5) fastening the bamboo sleepers in step 4) by using a fastener, to obtain a one-step integrally-formed bamboo sleeper.

As a further improvement of the foregoing technical solution.

Preferably, step 3) specifically includes:

assembling the blanks in step 2) to obtain a slab, and simultaneously pressing and heating upper and lower parts of the slab to cure and solidify it, to obtain a bamboo sleeper billet, where the pressure in the center of the slab is 15-30 MPa, and the temperature is 120-160° C.

A thickness of the slab is D, and a pressing time is t, where, t=D×30, a unit of t is s, and a unit of D is mm.

Preferably, step 3) specifically includes:

after placing the blanks in step 2) in a cold compacting mold for compacting to a predetermined target thickness, fastening the cold compacting mold and the blanks and then placing the fastened cold compacting mold and blanks in a device or a drying kiln filled with heat conduction oil for curing and solidifying, and then cooling, to obtain the bamboo sleeper billet; the temperature for curing is 120-160° C., and the time is 1-9 h.

A medium in the drying kiln is wet air, flue gas, or superheated water vapor.

When the cured and solidified blanks are cooled to be at a temperature 20-40° C. higher than the indoor temperature, the cold compacting mold is removed to obtain the bamboo sleeper billet.

Preferably, step 3) specifically includes:

curing the blanks in step 2) by high-frequency assisted hot pressing, to obtain a bamboo sleeper billet, where in the high-frequency assisted hot pressing, a power supply input voltage is 380 V, a DC output voltage is 4-7 kV, an oscillation frequency is 6.5-7.3 MHz, a pressure is greater than 20 MPa, and a temperature is 120-140° C.

The anti-mildew and/or anti-corrosion and/or anti-insect treatment in step 4) specifically includes: coating a dopamine solution on a surface of the bamboo sleeper billet and drying, coating a titanyl sulfate solution, drying, and then coating a silver nitrate solution, and drying, to obtain the bamboo sleeper.

The pretreating in step 1) specifically includes: removing an outer green part and an inner yellow part from the bamboo unit, steaming and softening, and then washing and grinding, to obtain the pretreated bamboo unit.

Preferably, in step 1), the water vapor is at the temperature of 110-180° C.

Preferably, the adhesive is a phenolic resin or modified urea-formaldehyde resin solution with a solid content of 20%-30%.

Preferably, the adhesive dipping is an ultrasonic pulsation assisted atmospheric treatment for 15-30 min.

Preferably, during the adhesive dipping, the pressure is 0.2-0.8 MPa, and the time is 10-20 min.

The solution for the pretreatment of steaming is an aqueous ammonia or sodium hydroxide solution with a pH value of 8-9, and the steaming time is 1-2 h.

Preferably, a concentration of the dopamine solution is 0.01-1 mg/mL; and the dopamine solution, the titanyl sulfate solution, and the silver nitrate solution are each coated 2-4 times.

Preferably, a pH value of the dopamine solution is 7-9; a concentration of the titanyl sulfate solution is 0.001-1 mol/L; and a concentration of the silver nitrate solution is 0.001-0.1 mol/L.

Preferably, the pretreated steaming solution is an aqueous ammonia or sodium hydroxide solution with a pH value of 8-9, and the steaming time is 1-2 h.

Preferably, the fastener is a stainless steel ferrule, and has a thickness of 2-4 mm and a width of 50-60 mm.

The one-step integrally-formed bamboo sleeper has a length of 1400-2900 mm, a width of 140-360 mm, and a thickness of 120-300 mm, a fastener close to an end portion of the bamboo sleeper has a distance of 200-300 mm with the end portion, and a fastener close to a middle portion of the bamboo sleeper has a distance of 200-500 mm with the middle portion.

Compared with the prior art, the advantages of the present invention are.

In the one-step integrally-formed bamboo sleeper and the preparation method thereof, by coupling multiple techniques such as high-temperature hydrothermal drying multi-effect treatment, curing and solidifying, polydopamine treatment, anti-mildew and/or anti-corrosion and/or anti-insect treatment ($Ag/TiO_2$ doped protection for the surface), and fastening by fasteners, the requirements on high-value and green sleepers in track construction can be fully satisfied. Moreover, the distinctive "bamboo culture" is highly praised at home and abroad. The bamboo sleeper has a suitable elastic modulus, uniform strength, good insulation, high climate resistance, high-efficiency insect prevention, environmental friendliness, easy recycling and reusing, and has a quite prominent economic, social and ecological benefits.

BRIEF DESCRIPTION OF THE DRAWINGS

FIG. 3 is a test result diagram of the one-step integrally-formed bamboo sleeper of Example 1 of the present invention.

DESCRIPTION OF THE EMBODIMENTS

The following will describe the present invention in detail in combination with the specification and the specific embodiments. Unless otherwise specified, the following materials and instruments are commercially available.

Example 1

(By Using a Bamboo Sleeper With a Length of 1800 mm, a Width of 200 mm, and a Thickness of 140 mm as an Example)

Figure 1:
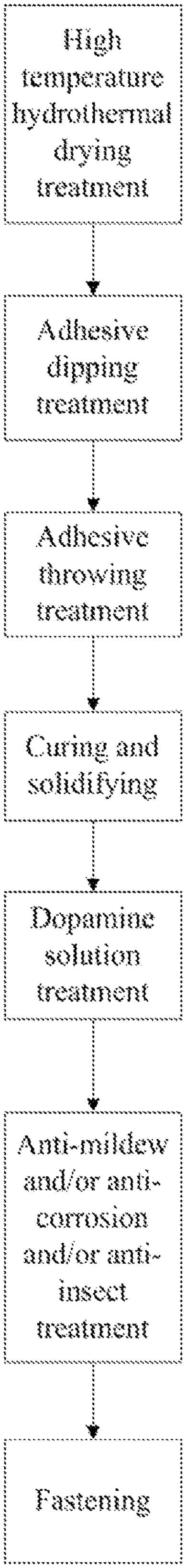
FIG. 1 is a schematic flowchart of a process of Example 1 of the present invention.

As shown in FIG. 1, the preparation method of the one-step integrally-formed bamboo sleeper in this example specifically has the following steps.

(1) A 4-year raw moso bamboo was selected and cut into sections each with a length of 1900 mm±10 mm, to obtain a bamboo cylinder section.

(2) The bamboo cylinder section was cleaved, from which an outer green part and a yellow inner part were 100% removed, then placed in an ammonia liquid with a pH value of 8.5 for steaming for 30 min, washed, and then mechanically ground to form a filamentous bamboo unit.

(3) The filamentous bamboo unit was dried by a dry bulb at 150° C. and by superheat water vapor at of 30° C., until a water content of the filamentous bamboo unit was approximately 13%, to obtain a dried and modified filamentous bamboo unit. High-temperature hydrothermal modification treatment can kill microorganisms and insect pests, and can also decompose carbohydrate substances such as starch in bamboo. The decrease in the mechanical strength caused by high temperature can be ameliorated by polydopamine treatment in the subsequent process, and the polydopamine did not affect the subsequent gluing and can prevent water from entering the filamentous bamboo unit.

(4) The dried and modified filamentous bamboo unit was dipped in a phenolic resin solution with a solid content of 25%, and was then subject to ultrasonic pulse assisted normal-pressure treatment for 20 min, adhesive throwing, draining, and then drying, until the water content of the filamentous bamboo unit was controlled to 15%, to obtain a blank.

In other examples, the adhesive dipping may be a treatment for 10-20 min at a pressure of 0.2-0.8 MPa, which can also achieve the same or similar technical effect.

(5) The blanks were paved and assembled in a prefabricated mold, and the phenolic resin adhesive in the filamentous bamboo unit was solidified by high-frequency assisted hot pressing, to obtain a one-step integrally-formed bamboo sleeper billet.

In this example, parameters of the high-frequency assisted process were: a power supply input voltage of 380 V, a DC output voltage of 6 kV, and an oscillation frequency of 6.9

Mhz. Parameters of the hot pressing process were: a pressure of 20 MPa, a temperature of 130° C., and a hot pressing time of 4200 s.

In other examples, the high-frequency assisted process may also be replaced with a bidirectional pressure-bidirectional heating molding technology, a room temperature cold pressing mold locking-high-temperature curing and solidifying technology, or a high-frequency assisted one-way high-temperature hot pressing technology, so that the adhesive can be fully cured and the filamentous bamboo units can be tightly connected together.

(6) The bamboo sleeper billet was mechanically processed, and then coated, in a manner of spraying, by a 0.05 mg/ml dopamine solution (a Tris buffer liquid was added in advance to adjust the pH of the dopamine solution to be 8) three times, where each time before spraying, it was requited to wait for the last coating to be fully dried, and a self-made Ag/$TiO_2$-doped multifunctional treatment liquid was coated on the surface of the bamboo sleeper billet three times, to obtain a bamboo sleeper undergone anti-mildew treatment. The specific steps were as follows.

(6.1) The bamboo sleeper billet was mechanically processed, repeatedly coated by a 0.05 mg/mL dopamine solution of which a pH value was adjusted to 8 by a Tris buffer solution, where each time it was required to wait for the coating layer to be dried to be an extent of non-stick in hand, and then dried at 70° C. for 40 min, to obtain a bamboo sleeper billet covered by a polydopamine membrane.

(6.2) A surface of the bamboo sleeper billet covered by the polydopamine membrane was coated by a 0.01 mol/L titanyl sulfate solution and then coated by an ammonia liquid (in other examples, a sodium hydroxide solution can be used); and the mixed liquids were coated and a pH test paper was used to measure a pH value of the surface of the bamboo sleeper billet, until the pH value was 9; and when the coating layer was non-stick in hand, the bamboo sleeper billet was dried at 70° C. for 60 min, to obtain a bamboo sleeper billet loaded with $TiO_2$.

(6.3) The bamboo sleeper billet loaded with $TiO_2$ was coated by a 0.001 mol/L silver nitrate solution three times, and after the coating layer was non-stick in hand, dried at 80° C. until a water content of the bamboo sleeper billet loaded with $TiO_2$ was approximately 10%, to obtain a bamboo sleeper undergone anti-mildew treatment.

(7) The bamboo sleeper undergone anti-mildew treatment was locked and fastened by two stainless steel ferrules with a thickness of 2 mm and a width of 50 mm, where an edge of each of the steel ferrules at the left and right ends of the bamboo sleeper had a distance of 230 mm with each corresponding end portion of the bamboo sleeper, to obtain a one-step integrally-formed bamboo sleeper. In order to prevent fiber separation caused by repeated load applying or overloading of the bamboo sleeper during use, stainless steel ferrules or fasteners made of other materials were used for locking and fastening.

Figure 2:
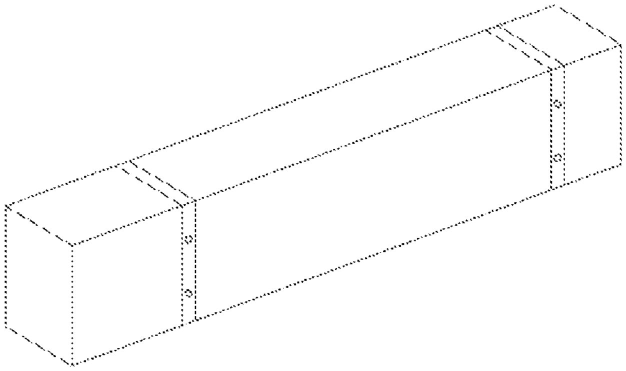
FIG. 2 is a schematic structural diagram of a one-step integrally-formed bamboo sleeper of Example 1 of the present invention.

In this example, the bamboo was subject to multiple coupled techniques such as high-temperature hydrothermal drying modification multi-effect treatment, gluing, Ag/$TiO_2$-doped protection for a surface, locking and fastening, to produce a one-step integrally-formed bamboo sleeper, as shown in the FIG. 2. The specific process flow was as follows.

Original bamboo cutting→cleaving→removing an outer green part and an inner yellow part→basic liquid assisted steaming and softening→washing→grinding and scattering→high-temperature hydrothermal drying multi-effect treatment→phenolic resin dipping→drying→billet paving and assembling→high-frequency assisted hot pressing→mechanical processing→polydopamine-Ag/$TiO_2$-doped treatment→steel ferrule fastening→bamboo sleeper.

Tests of the density, UV resistance, water absorption thickness expansion rate, anti-skid performance, bending elastic modulus and horizontal shear strength of the manufactured bamboo sleeper billet were carried out in laboratory, as shown in the FIG. 3, which indicated that the bamboo sleeper manufactured in this example met the requirements of high-value and green sleepers in track construction.

Example 2

This example is substantially the same as Example 1, with the only difference in that: the high-frequency assisted high-temperature hot pressing process is replaced with a bidirectional pressure-bidirectional heating molding technology, and the specific steps were as follows:

assembling blanks, to obtain a slab, and placing the slab on a pad to simultaneously press and heat upper and lower parts of the slab for 70 min, to cure and solidify the slab, to obtain a bamboo sleeper billet, where a center of the slab had a pressure of 20 Mpa and a temperature of 130° C.

Example 3

This example is substantially the same as Example 1, with the only difference in that: the high-frequency assisted high-temperature hot pressing process is replaced with a room temperature cold pressing mold locking-high-temperature curing and solidifying technology, and the specific steps were as follows:

placing a blank in a cold pressing mold, compacting the blank in the mold by a cold pressing machine, to compact the blank to 140 mm; then locking the mold and the blank; feeding the mold loaded with the blank fed together to a drying kiln at a high temperature of 130° C. for successively 5 h, to enable the slab to be fully cured and solidified; and after the solidification, gradually cooling the mold and the slab in an indoor environment, and when the slab was at a temperature 40° C. higher than the indoor temperature, removing the mold, where the bamboo sleeper slab is cured and solidified, to obtain the bamboo sleeper billet.

Although the present invention has been disclosed in preferred embodiments above, it is not intended to limit the present invention. Any person skilled in the art may make many possible variants and modifications to the present invention without departing from the scope of the present invention by using the foregoing disclosed technical content, or modify it to equivalent embodiments of equivalent variants. Therefore, any simple amendments, equivalent variants, and modifications made to the foregoing embodiments according to the technical essence of the present invention without departing from the content of the technical solution of the present invention should fall within the scope of protection of the technical solution of the present invention.

What is claimed is:

1. A preparation method of a one-step integrally-formed bamboo sleeper, including the following steps:

step 1) drying and modifying a pretreated bamboo unit by using water vapor with a degree of superheat of 10-80° C., until a water content of the bamboo unit is 8-20%, to obtain a dried and modified bamboo unit;

step 2) dipping the dried and modified bamboo unit obtained in step 1) in an adhesive to perform adhesive dipping, spinning, draining, and drying, until the water content of the bamboo unit is 10%-16%, to obtain a blank;

step 3) curing and solidifying the blank in step 2), to obtain a bamboo sleeper billet;

step 4) coating a dopamine solution on a surface of the bamboo sleeper billet in step 3), and then performing anti-mildew and/or anti-corrosion and/or anti-insect treatment, to obtain a bamboo sleeper; and step 5) fastening the bamboo sleepers in step 4) by using a fastener, to obtain a one-step integrally-formed bamboo sleeper, wherein step 3) specifically includes:

curing the blanks in step 2) by a high-frequency assisted hot pressing, to obtain the bamboo sleeper billet, where in the high-frequency assisted hot pressing, a power supply input voltage is 380 V, a DC output voltage is 4-7 kV, an oscillation frequency is 6.5-7.3 MHZ, a pressure is greater than 20 MPa, and a temperature is 120-140° C.

2. The method of claim 1, wherein step 3) specifically includes:

assembling the blanks in step 2) to obtain a slab, and simultaneously pressing and heating upper and lower parts of the slab to cure and solidify it, to obtain the bamboo sleeper billet, where the pressure in the center of the slab is 15-30 MPa, and the temperature is 120-160° C.

3. The method of claim 2, wherein a thickness of the slab is D, and a pressing time is t, where, $t=D\times30$, a unit of t is seconds, and a unit of D is mm.

4. The method of claim 3, wherein the anti-mildew and/or anti-corrosion and/or anti-insect treatment in step 4) specifically includes: coating the dopamine solution on a surface of the bamboo sleeper billet and drying, coating a titanyl sulfate solution, drying, and then coating a silver nitrate solution, and drying, to obtain the bamboo sleeper.

5. The method of claim 3, wherein the pretreating in step 1) specifically includes: removing an outer green part and an inner yellow part from the bamboo unit, steaming and softening, and then washing and grinding, to obtain the pretreated bamboo unit.

6. The method of claim 2, wherein the anti-mildew and/or anti-corrosion and/or anti-insect treatment in step 4) specifically includes: coating the dopamine solution on a surface of the bamboo sleeper billet and drying, coating a titanyl sulfate solution, drying, and then coating a silver nitrate solution, and drying, to obtain the bamboo sleeper.

7. The method of claim 2, wherein the pretreating in step 1) specifically includes: removing an outer green part and an inner yellow part from the bamboo unit, steaming and softening, and then washing and grinding, to obtain the pretreated bamboo unit.

8. The method of claim 1, wherein step 3) specifically includes:

after placing the blanks in step 2) in a cold compacting mold for compacting to a predetermined target thickness, fastening the cold compacting mold and the blanks and then placing the fastened cold compacting mold and blanks in a device or a drying kiln filled with heat conduction oil for curing and solidifying, and then cooling, to obtain the bamboo sleeper billet; the temperature for curing is 120-160° C., and the time is 1-9 hours.

9. The method of claim 8, wherein the medium in the drying kiln is wet air, flue gas, or superheated water vapor.

10. The method of claim 9, wherein the anti-mildew and/or anti-corrosion and/or anti-insect treatment in step 4) specifically includes: coating the dopamine solution on a surface of the bamboo sleeper billet and drying, coating a titanyl sulfate solution, drying, and then coating a silver nitrate solution, and drying, to obtain the bamboo sleeper.

11. The method of claim 9, wherein the pretreating in step 1) specifically includes: removing an outer green part and an inner yellow part from the bamboo unit, steaming and softening, and then washing and grinding, to obtain the pretreated bamboo unit.

12. The method of claim 8, wherein when the cured and solidified blanks are cooled to be at a temperature 20-40° C. higher than an indoor temperature of about 25° C., the cold compacting mold is removed to obtain the bamboo sleeper billet.

13. The method of claim 12, wherein the anti-mildew and/or anti-corrosion and/or anti-insect treatment in the step 4) specifically includes: coating the dopamine solution on a surface of the bamboo sleeper billet and drying, coating a titanyl sulfate solution, drying, and then coating a silver nitrate solution, and drying, to obtain the bamboo sleeper.

14. The method of claim 8, wherein the anti-mildew and/or anti-corrosion and/or anti-insect treatment in step 4) specifically includes: coating the dopamine solution on a surface of the bamboo sleeper billet and drying, coating a titanyl sulfate solution, drying, and then coating a silver nitrate solution, and drying, to obtain the bamboo sleeper.

15. The method of claim 8, wherein the pretreating in step 1) specifically includes: removing an outer green part and an inner yellow part from the bamboo unit, steaming and softening, and then washing and grinding, to obtain the pretreated bamboo unit.

16. The method of claim 1, wherein the anti-mildew and/or anti-corrosion and/or anti-insect treatment in step 4) specifically includes:

coating the dopamine solution on a surface of the bamboo sleeper billet and drying, coating a titanyl sulfate solution, drying, and then coating a silver nitrate solution, and drying, to obtain the bamboo sleeper.

17. The method of claim 1, wherein the pretreating in step 1) specifically includes: removing an outer green part and an inner yellow part from the bamboo unit, steaming and softening, and then washing and grinding, to obtain the pretreated bamboo unit.

* * * * *